United States Patent

Urban et al.

Patent Number: 5,630,206
Date of Patent: May 13, 1997

[54] POSITION ENHANCED CELLULAR TELEPHONE SYSTEM

[75] Inventors: G. Daniel Urban, Silver Spring, Md.; Robert McCarthy, Arlington, Va.; David Schuchman, Rockville, Md.; Ronald Bruno, Arlington, Va.

[73] Assignee: Stanford Telecommunications, Inc., Reston, Va.

[21] Appl. No.: 288,764

[22] Filed: Aug. 11, 1994

[51] Int. Cl.⁶ .................................................. H04B 7/00
[52] U.S. Cl. .......................... 455/54.1; 455/74; 455/89; 379/88; 379/58; 342/357; 340/989; 340/993
[58] Field of Search .................. 455/33.1, 54.1, 455/74, 89; 379/58, 59, 88; 340/426, 988, 993, 989; 342/357, 450, 457

[56] References Cited

U.S. PATENT DOCUMENTS

| | | | |
|---|---|---|---|
| 4,350,970 | 9/1982 | Von Tomkewitsch | 340/989 |
| 4,794,368 | 12/1988 | Grossheim et al. | 340/989 |
| 5,043,736 | 8/1991 | Darnell et al. | 342/357 |
| 5,058,150 | 10/1991 | Kang | 379/88 |
| 5,131,019 | 7/1992 | Sheffer et al. | 379/59 |
| 5,365,450 | 11/1994 | Schuchman et al. | 342/457 |
| 5,420,912 | 5/1995 | Kopp et al. | 379/63 |
| 5,422,813 | 6/1995 | Schuchman et al. | 455/33.2 |
| 5,510,801 | 4/1996 | Engelbrecht et al. | 342/357 |

FOREIGN PATENT DOCUMENTS 9013196  11/1990  WIPO ............................ 379/58

*Primary Examiner*—Reinhard J. Eisenzopf
*Assistant Examiner*—Doris To
*Attorney, Agent, or Firm*—Jim Zegeer, Esq.

[57] ABSTRACT

A position monitoring system having a position finder subsystem connected via a cellular telephone to a central monitoring station, a receive/transmit device carried with the position monitoring subsystem. A remote personal signalling subsystem comprising an RF coder modulator for transmitting a coded RF signal, and operating switch for activating the RF coder modulator. A receiver/transmit device is carried with a position monitoring subsystem for receiving the coded RF signal, decoding same and transmitting a coded RF acknowledgement signal. The remote personal signalling subsystem includes an RF decoder and demodulator for receiving and decoding the coded RF acknowledgement signal and a tactile signalling device is operated by the RF decoder and demodulator upon receipt of the coded RF acknowledgement signal and provides a tactile signal to a user that the RF coded signal had been properly received by the position finding subsystem. The transceiver is carried by the position finding subsystem is connected to the central monitoring station and the sending coded RF acknowledgement signal is controlled by central monitoring station.

7 Claims, 4 Drawing Sheets

POSITION ENHANCED CELLULAR TELEPHONE SYSTEM

REFERENCE TO RELATED APPLICATIONS

This application is related to the following: U.S. application Ser. Nos. 07/992,892 filed Dec. 17, 1992 (now U.S. Pat. No. 5,365,450), 08/079,810 filed Jun. 22, 1993, 08/115,087 filed Sep. 2, 1993 (now U.S. Pat. No. 5,422,813), and 08/203,257 filed Mar. 1, 1994 (now U.S. Pat. No. 5,510,801), all of which are incorporated herein by reference.

BACKGROUND AND BRIEF DESCRIPTION OF THE INVENTION

The current cellular telephone, when equipped with position finding equipment, makes it possible for people to gain access to a variety of services such as emergency roadside assistance (ERA), personal emergency response (PER) service, vehicle tracking assistance (VTA), traveler information assistance (TIA), traffic incident management (TIM), and fleet management services, as well as a number of other services.

The above-identified applications include disclosures of automatic determination of the geographical position (in latitude and longitude) of a mobile user that serves as the address of the mobile user. The position information is derived from GPS satellite, commercial RF broadcasts such as AM and FM radio and television broadcasts or combinations thereof. This invention, in addition to providing the position or location information, provides an interface for easily providing for integration or combination of the position finding signals to the cellular telephone system and can be called position enhanced cellular services. In one embodiment, the enhanced cradle is provided with a recorder, data interface, and panic button alarm sub-interface which couples a standard car alarm and a unique panic button disclosed herein, in combination with the enhanced cradle for cellular telephone.

In a second embodiment, the enhanced cradle includes a concealed unit which includes a car alarm and panic button alarm interface, with a recorder and data interface being in a separate cradle. In this embodiment, the concealed unit and car alarm units are concealed under the dash or in another portion of the vehicle such as possibly in the trunk.

In a third embodiment, a unique car alarm and panic button alarm interface are in a unit which may be concealed under the dash or in the trunk of a car, and the cradle includes a recorder and a data interface. The receiver transmitter for the position locator and the position location circuitry are as disclosed in the above-referenced applications.

According to the present invention, the enhanced cradle provides features not found in typical mobile telephone cradles while preserving the functionality already present in such cradles. As discussed above, three primary features include:

A recorder which permits the operator to easily record and replay messages. When used in the vehicle applique unit (VAU), directions and instructions from the operator at a central station may be stored and then recalled for use at a later time. Both manual and remote control of the recording process may also be performed. Since this can easily be performed by one hand and without the driver taking his or her eyes off of the road, it is also a safety feature.

Secondly, a panic button/interalarm interface permits the status signals from a car alarm to be monitored by the cradle and used to notify authorities, via the cellular telephone, in the event of a vehicle theft or personal attack situation. The panic button may also be coupled via either the remote RF control activation or by mechanical switching. It is also possible to use this interface to pass commands to the car alarm for the purpose of configuration and control.

Thirdly, the data interface provides a two-way data flow path between a port on the cradle and a service center for the hybrid GPS/data link system as disclosed in the above-referenced application. This process is unique in that it uses the data-in-voice process of the system to pass low rate data. Signals within the mobile unit may be conveyed over audio lines (an RJ-11 like interface) or the control bus (RS232 like interface) of the mobile phone/VAU combination.

DESCRIPTION OF THE DRAWINGS

The above and other objects, advantages and features of the invention will become apparent when considered with the following specification and accompany drawings wherein.

DETAILED DESCRIPTION OF THE INVENTION

Figure 1:
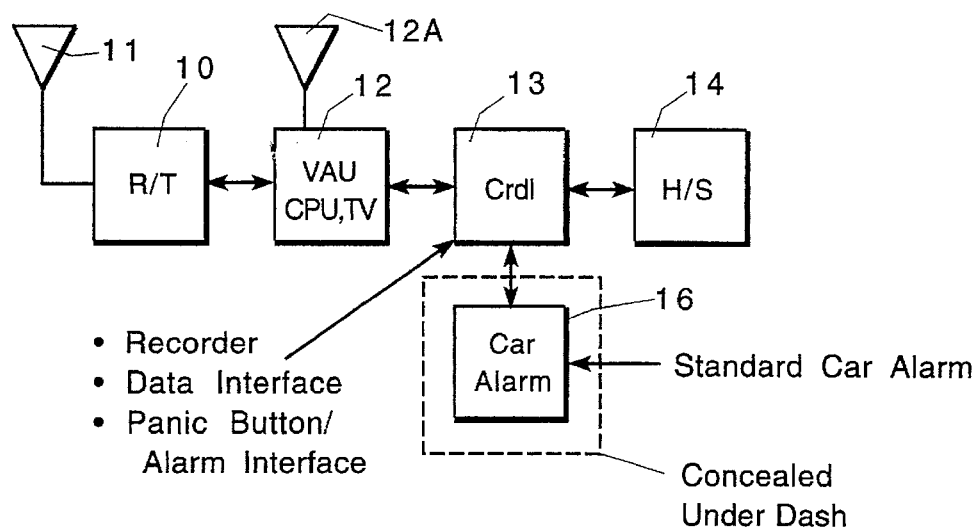
FIG. 1 illustrates one embodiment for implementing the interface invention.
Figure 2:
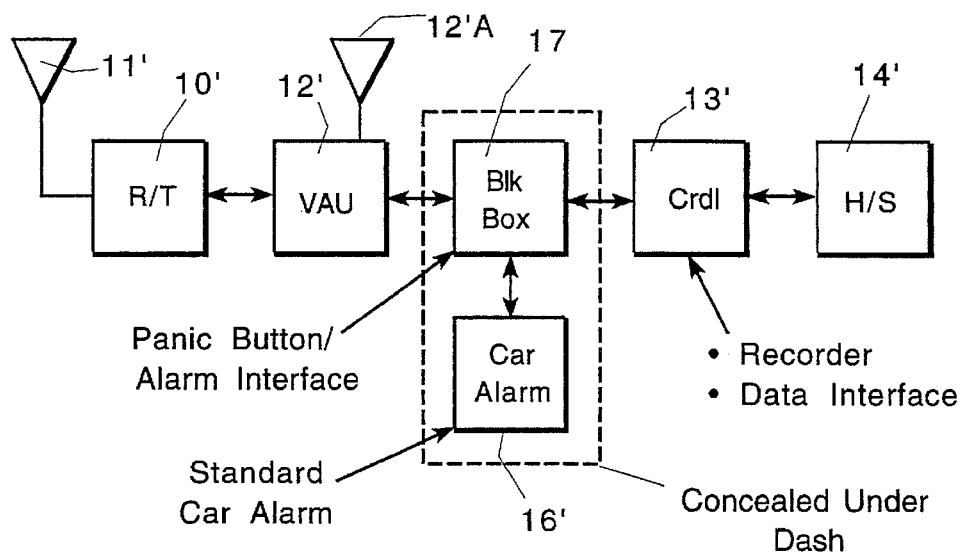
FIG. 2 illustrates a second embodiment for implementing the interface of the present invention.
Figure 3:
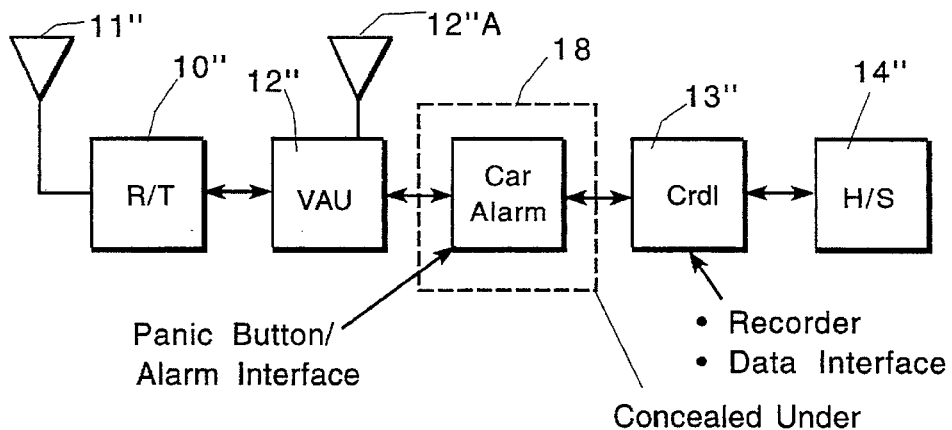
FIG. 3 illustrates a third embodiment for implementing the interface invention.

FIGS. 1–3 illustrate the enhanced cradle system of the present invention.

In FIG. 1, a conventional cellular telephone receive/transmit unit 10 is connected to an antenna 11 and a position enhancing value applique unit 12 (having its GPS/commercial RF broadcast antenna system 12A) which, in turn, is coupled through a data interface to the cradle unit 13 which is connected through a modular connector (data/audio connector to handset shown in FIG. 4) to handset 14. The position finding GPS and commercial broadcast position finding units in position or location unit or in VAU 12 are preferably of the type disclosed in the above-referenced applications, particular reference being made to the TV/GPS system disclosed in U.S. Ser. No. 08/203,257. A standard car alarm 16 which may be concealed under the dash or under the hood or elsewhere in the vehicle is interconnected with the cradle handset by a further connector 42 shown in FIG. 4. In this embodiment, the cradle 13 carries a recorder 38 module (FIG. 4), a data interface 46, and a panic button/alarm interface 42.

In the embodiment shown in FIG. 2, the receive/transmit unit 10' is connected to the value applique unit 12' and interposed between the cradle 13' is a concealed unit labeled 17 which also is contained within and concealed under the dash with conventional or standard car alarm 16. The interface to the panic button/alarm is now carried in the concealed 17 instead of with a recorder and data interface in cradle unit 13'. In this embodiment, the alarm and panic button interfaces are concealed.

In the embodiment shown in FIG. 3, the car alarm is interposed between the position finder unit or value applique 12" and the cradle 13" and a car alarm unit 18 which may incorporate the panic button/alarm interface and be concealed under the dash as indicated by dotted lines in FIGS. 1, 2 and 3.

Figure 4:
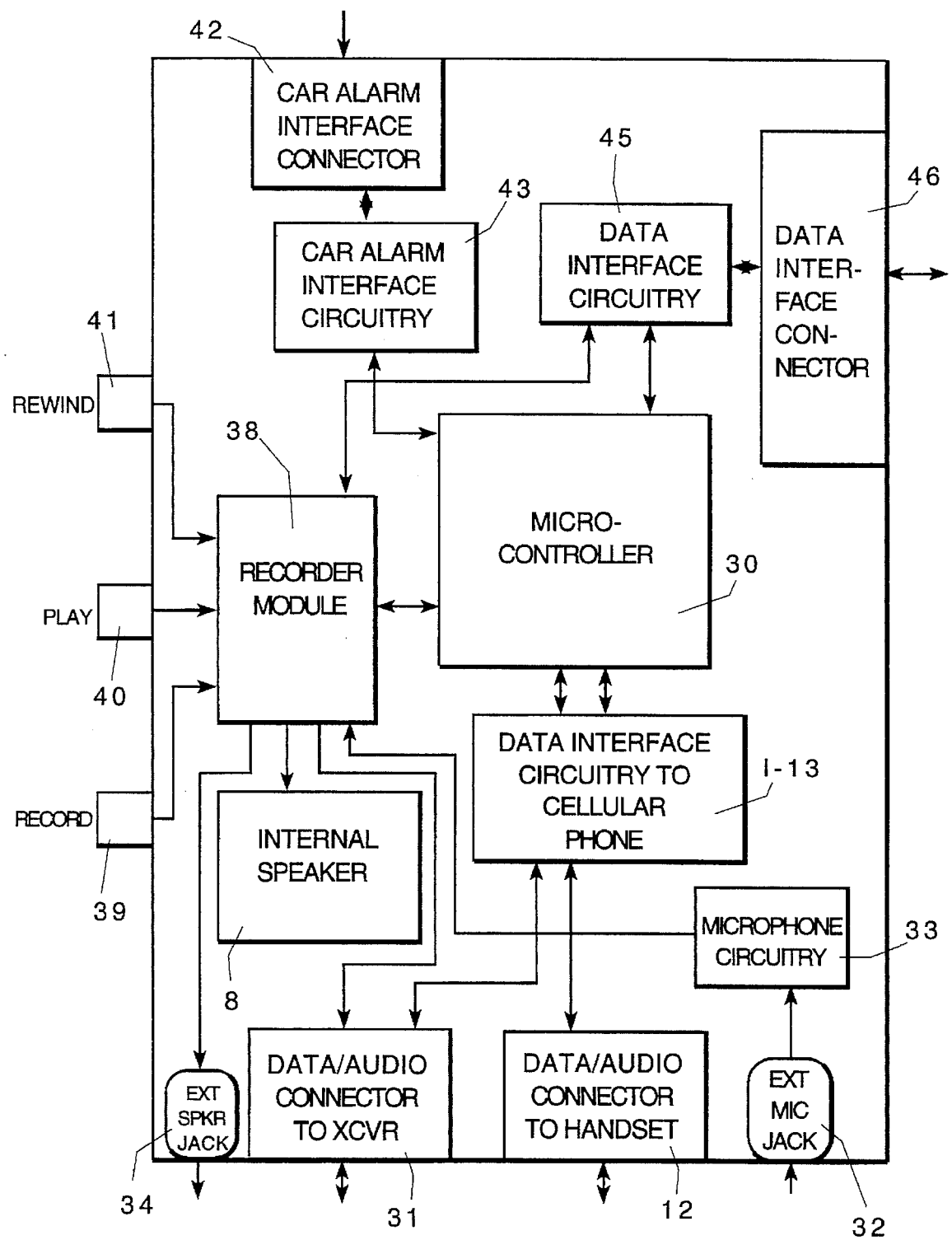
FIG. 4 is a block diagram of the enhanced cradle incorporating the invention.

Referring now to FIG. 4, the generalized enhanced cradle block diagram is illustrated as including a microcontroller 30 which provides the unit with a processing capacity not typically found in standard mobile telephone cradle. The processor 30 monitors and transfers data over the data/audio interface, e.g., data/audio connector to transceiver 10 via the data/audio connector 31 and to handset 14 via the date/audio connector 12 is the data interface circuitry I-13 (signal and data flow indicated by arrows at each connector or jack). While microcontroller 30 permits addition of new position and alarm features, the basic functionality of the ordinary cradle is preserved within the enhanced cradle of this invention. Functionality of external microphone jack 32 and complementary microphone circuitry 33 as well as external speaker jacks 34 are carried over from standard mobile phone cradle and are not, per se, novel in this invention.

The invention features include a recorder module 38 which has activation buttons "record" 39, "play" 40, "rewind" 41. In terms of the present invention, in a preferred embodiment, a solid state memory, makes it feasible to implement small recorders of the type used in this application with rather large storage capacities in terms of several minutes or more at low cost. Alternative conventional single clip memories (ISD 2500 series from Information Storage Devices) and tape microcassettes can be used, particularly if a replaceable record of the stored message is desired. Instead of an audible presentation of stored messages, the transducer can be a visual display or a projector for a heads-up-type display.

In the case of the panic circuitry (FIG. 5), the interface includes a connector 42 and the interface circuitry 43 which is coupled to the microprocessor or controller 30. The interface then monitors for conditions provided by signals from the alarm, that indicate personal panic, unauthorized entry, or unexpected motion of the vehicle. Other signals from within the vehicle may also be routed through this interface.

The third feature added by the enhanced cradle in the present invention is the data interface 45. A connector 46 and its supporting data interface circuitry 45 comprise this feature. In this embodiment, the connector 46 can be an RS232 connector for the data interface.

Figure 5:
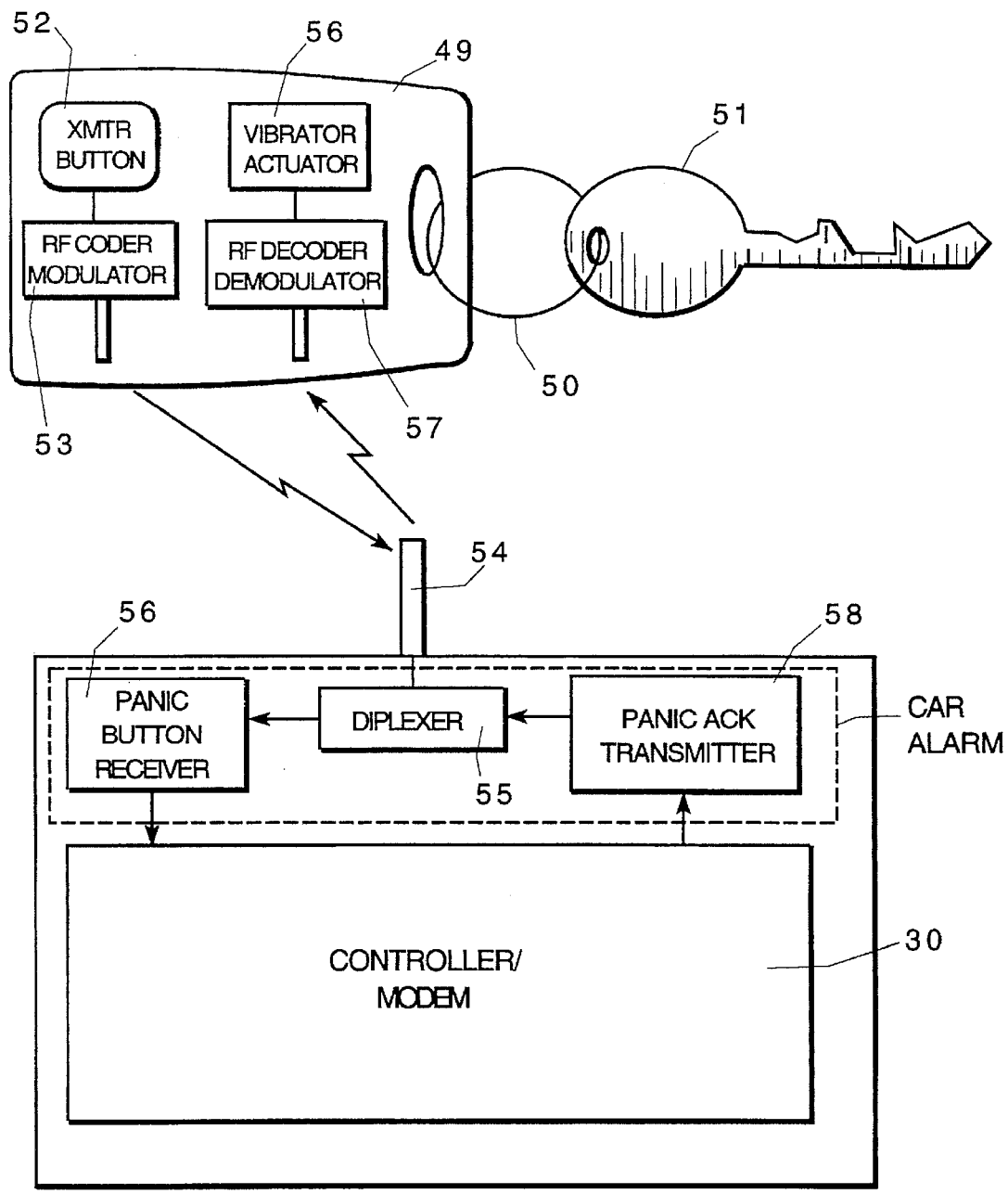
FIG. 5 is a block diagram illustrating the panic button aspect of the system.

Referring now to FIG. 5 which disclose the panic button car alarm interface. In this embodiment, the personal panic button unit 49 is illustrated as being on a key chain 50 and, FIG. 5 is somewhat enlarged relative to the key 51. The panic button unit 49 has two modules, namely a transmit button 52 and radio frequency (RF) coder modulator 53 which transmits an RF (or ultrasonic or infrared signal) to the receiving antenna or device 54 (which may be in black box 17) and, a vibrator actuator 56 and a receiving antenna RF coupled to a RF decoder demodulator 57 which is coupled to vibrator actuator 56 in preference to an audible alarm or return signal. The vibrator actuator 56 provides a tactile signal to signify to the user that his alarm condition has been received and transmitted and acknowledged by a central station.

In the vehicle applique unit equipment 12, its receiving antenna 54 (which may be in the concealed unit 17) couples through a diplexer 55 to a panic button receiver circuit 56 and the diplexer 55 is also coupled to a panic acknowledgement transmitter 58, both the panic button receiver 56 and the panic acknowledgement transmitters 58 are coupled to controller 30 shown in FIG. 4. Thus, the panic button 49 in this preferred embodiment is a two-way communication device that operates as follows: the user, upon pressing the panic button will send an RF signal that will be received by the vehicle receiver via antenna 54. The vehicle receiver will then send an acknowledgement to the user, vibrating the panic button, via an RF signal and the user will thus be informed that an acknowledgement is sent via an inaudible vibration of the panic button.

When a person pushes the transmit button on the key chain device, the RF coded signal is emitted and its signal is received and interpreted by microprocessor 30, (FIG. 4). The controller modem 30 then initiates a personal emergency response call and informs a person via an RF coded signal from the panic acknowledgement transmitter which is received by the key chain device and the person is informed that "help is on the way" via a silent actuator that vibrates the key chain device.

The functionality of the vehicle applique unit 12 as described above, may be packaged in a hand-held device as well. A hand-held system would not incorporate a separate key chain device—it's a hand-held unit essentially supports that function without an additional key chain device. It will be apparent and obvious to those skilled in the art that the hand-held device need not incorporate the separate functionality of additional key chain devices and that the key chain device and that the key chain device may be used in addition to the hand-held device.

An important feature of the invention is the use of a recorder digital memory chip for recording voice digitally in the value applique unit and applying back to the user of the cellular telephone. Such a chip would be used to download a set of routing instructions to the driver of the vehicle. The driver would then be able to retrieve and replay the instructions as often as required in order to follow the route. Functions such as initiating the storage as well as replaying and pausing the message would be controlled by the vehicle operator from the handset keypad via established commands, or by remote control from an intelligent service center.

Figure 6:
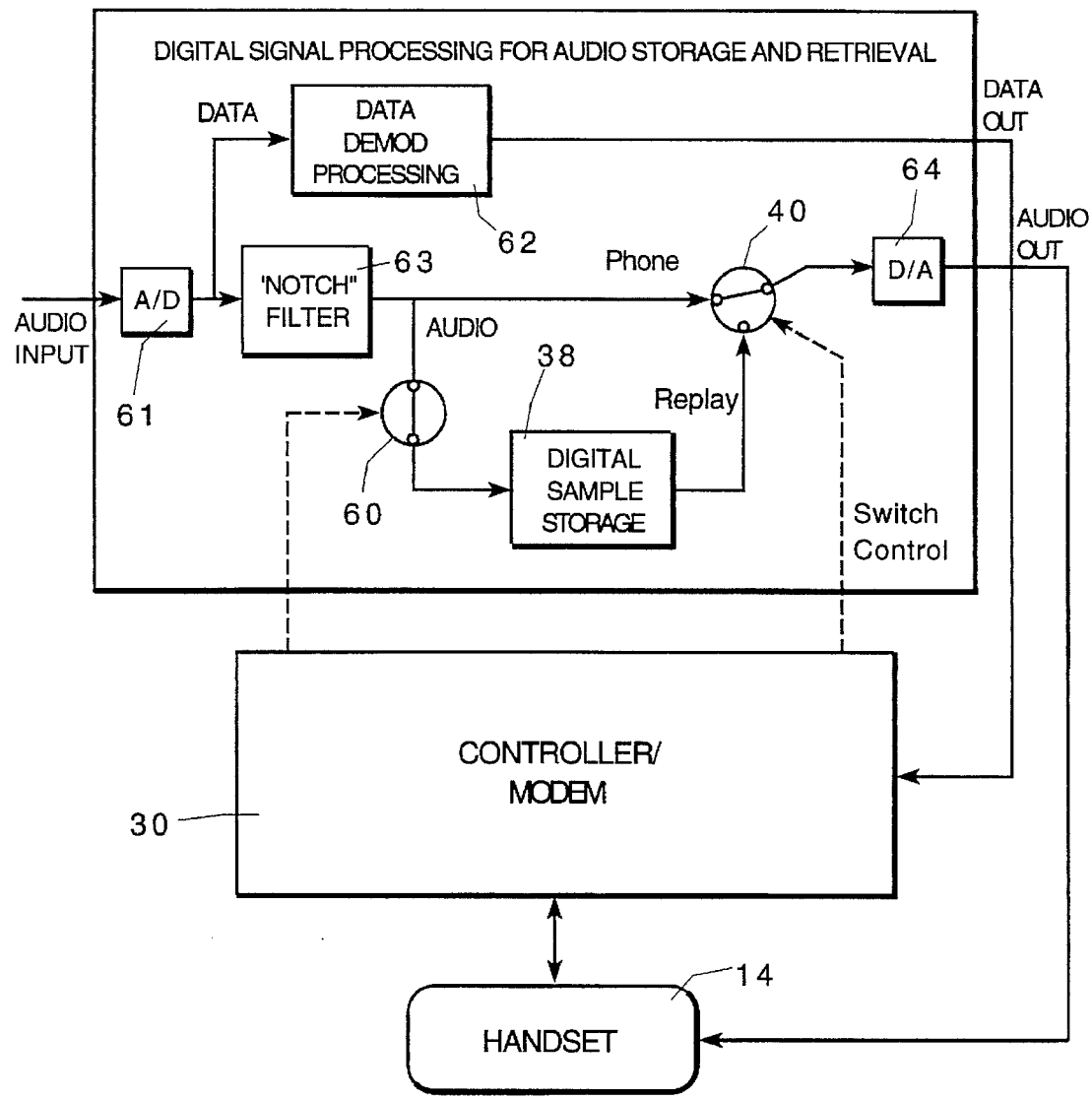
FIG. 6 is a further block diagram illustrating the digital signal processing for audio storage and retrieval according to the invention.

The logical diagram of the system that accomplishes this is illustrated in FIG. 6. It includes a channel having analog-to-digital connector 61, a data demodulator 62 and a notch filter 63 operating as disclosed in U.S. Ser. No. 08/079,810, incorporated herein by reference. The "voice" signals are supplied via switch 60, operated by controller 30 (as a result of "record" switch 39 actuation or remote control from a central station), digital storage 38 and, via replay switch 40 to a digital-to-analog play converter 64 for audio playback through the handset 14 or a speaker connected to jack 34. Note that when the set of routing instructions are coming over the audio channel, the switch leading to the digital sample storage memory (switch 60) will be thrown so that the incoming instructions will be stored. Later, when the telephone call is terminated and there is no more audio input, switch 40 will be thrown into the replay position so that the stored routing instructions can be retrieved and played into the handset or hands-free speaker of the cellular telephone. Also, notch filter 63 can be by-passed upon detecting the pressure of data.

Referring again to FIG. 6, the digital signal processing for audio storage and retrieval is illustrated. The notch filter and data demodulator processing functions are as described in copending application U.S. Ser. No. 08/079,810, which is incorporated herein by reference.

While preferred embodiments of the invention have been illustrated and described, it will be appreciated that other embodiments, adaptations and modifications of the invention will be readily apparent to those skilled in the art.

What is claimed is:

1. In a position monitoring system having a position finder subsystem connected via a cellular telephone to a central monitoring station, a receive/transmit means carried with said position monitoring subsystem, the improvement comprising:

a remote personal signalling subsystem comprising an RF coder modulator for transmitting a coded RF signal, and operating switch means for activating said RF coder modulator, a receiver/transmit means carried with said position finding subsystem for receiving said coded RF signal, decoding same and transmitting a coded RF acknowledgement signal, said remote personal signalling subsystem including RF decoder and demodulator for receiving and decoding said coded RF acknowledgement signal and a tactile signalling means operated by said RF decoder and demodulator upon receipt of said coded RF acknowledgement signal and provide a tactile signal to a user that said RF coded signal had been properly received by said position finding subsystem.

2. The position monitoring system defined in claim 1 including receive/transmit means carried by said position finding subsystem is connected to said central monitoring station and sending said coded RF acknowledgement signal is controlled by said central monitoring station.

3. In a cellular telephone system having a mobile transceiver unit on a driver operated vehicle for receiving and transmitting cellular phone signals and a navigation position receiver for generating position information signals for transmission to a central monitoring station and means at said central monitoring station for transmitting navigation signals to said mobile transceiver unit, the improvement comprising, recorder means in said mobile transceiver unit, record and play switch means for controlling said recorder means to record and store navigation signals from said central monitoring station and playback of stored navigation signals, and a speaker means for transducing stored navigation signals to an audio form useful to the driver, and wherein said recorder means is digital and includes means to convert analog audio signals to digital signals, first switch means for coupling said digital signals for storage in said recorder means, a digital-to-analog converter, second switch means for selectively coupling digital signals from said analog-to-digital converter to (1) said digital-to-analog converter or (2) said recorder means.

4. In a cellular telephone system having a mobile transceiver unit on a driver operated vehicle for receiving and transmitting cellular phone signals and a navigation position receiver for generating position information signals for transmission to a central monitoring station and means at said central monitoring station for transmitting navigation signals to said mobile transceiver unit, the improvement comprising, recorder means in said mobile transceiver unit, record and play switch means for controlling said recorder means to record and store navigation signals from said central monitoring station and playback of stored navigation signals, and a transducer means for transducing stored navigation signals to a form useful to the driver, and wherein said recorder means is digital and includes means to convert analog audio signals to digital signals, first switch means for coupling said digital signals for storage in said recorder means, a digital-to-analog converter, second switch means for selectively coupling digital signals from said analog-to-digital converter to said digital-to-analog convert or said recorder means, and wherein said cellular phone signals include data signals, a digital notch filter connected between said analog-to-digital converter and said digital-to-analog converter and a data demodulating circuit connected to said analog-to-digital converter in advance of said notch filter to receive and demodulate data signals from said cellular telephone signals.

5. The cellular telephone system defined in claim 4 including means to by-pass said notch filter.

6. In a cellular telephone system having a mobile transceiver unit on a driver operated vehicle for receiving and transmitting cellular phone signals and a navigation position receiver for generating position information signals for transmission to a central monitoring station and means at said central monitoring station for transmitting navigation signals to said mobile transceiver unit, the improvement comprising, recorder means in said mobile transceiver unit, record and play switch means for controlling said recorder means to record and store navigation signals from said central monitoring station and playback of stored navigation signals, and a transducer means for transducing stored navigation signals to a form useful to the driver, and wherein said navigation position receiver is connected via said mobile transceiver unit to said central monitoring station, further including:

a remote personal signalling subsystem comprising an RF code modulator for transmitting a coded RF signal, and an operating switch means for activating said RF code modulator, said transceiver unit including means for receiving said coded RF signal, decoding said coded RF signal and transmitting a coded RF acknowledgment signal to said remote personal signalling subsystem, said remote personal signalling subsystem including RF decoder and demodulator for receiving and decoding said coded RF acknowledgment signal and a tactile signalling means operated by said RF decoder and demodulator upon receipt of said coded RF acknowledgment signal and provide a tactile signal to a user that said RF coded signal had been properly received by said central station.

7. The position monitoring system defined in claim 6, wherein the transceiver means is connected to said central monitoring station and the sending said coded RF acknowledgment signal is controlled by said central monitoring station.

* * * * *